United States Patent
Creyghton et al.

(10) Patent No.: US 12,195,681 B2
(45) Date of Patent: Jan. 14, 2025

(54) PROCESS TO PREPARE FISCHER-TROPSCH DERIVED MIDDLE DISTILLATES AND BASE OILS

(71) Applicant: SHELL USA, INC., Houston, TX (US)

(72) Inventors: Edward Julius Creyghton, Amsterdam (NL); Olav Sammelius, Amsterdam (NL); Marcello Stefano Rigutto, Amsterdam (NL); Andries Hendrik Janssen, Amsterdam (NL)

(73) Assignee: Shell USA, Inc., Houston, TX (US)

( * ) Notice: Subject to any disclaimer, the term of this patent is extended or adjusted under 35 U.S.C. 154(b) by 0 days.

(21) Appl. No.: 18/000,955

(22) PCT Filed: Jun. 17, 2021

(86) PCT No.: PCT/EP2021/066351
§ 371 (c)(1),
(2) Date: Dec. 7, 2022

(87) PCT Pub. No.: WO2021/255145
PCT Pub. Date: Dec. 23, 2021

(65) Prior Publication Data
US 2023/0227737 A1   Jul. 20, 2023

(30) Foreign Application Priority Data
Jun. 17, 2020   (EP) .................... 20180628

(51) Int. Cl.
| | | |
|---|---|---|
| *C10G 67/14* | (2006.01) | |
| *B01D 3/10* | (2006.01) | |
| *B01D 3/14* | (2006.01) | |
| *B01J 29/74* | (2006.01) | |
| *B01J 35/64* | (2024.01) | |

(52) U.S. Cl.
CPC ............ *C10G 67/14* (2013.01); *B01D 3/10* (2013.01); *B01D 3/143* (2013.01); *B01J 29/7469* (2013.01); *B01J 35/643* (2024.01); *C10G 2300/1022* (2013.01); *C10G 2300/301* (2013.01); *C10G 2300/302* (2013.01); *C10G 2400/06* (2013.01); *C10G 2400/10* (2013.01)

(58) Field of Classification Search
CPC .. B66C 1/12; B66C 1/18; B66C 13/04; B66C 13/08; B01D 3/10; B01D 3/143; B01J 29/7469; B01J 35/643; C10G 2/30; C10G 2300/1022; C10G 2300/301; C10G 2300/302; C10G 2400/02; C10G 2400/06; C10G 2400/10; C10G 45/62; C10G 45/64; C10G 67/14; C10L 1/026; C10M 107/02; C10M 2205/173; C10N 2020/01; C10N 2020/011; C10N 2020/02

See application file for complete search history.

(56) References Cited

U.S. PATENT DOCUMENTS

| | | | |
|---|---|---|---|
| 7,285,693 B2 | 10/2007 | Clark | |
| 7,497,941 B2 | 3/2009 | Germaine | |
| 9,896,632 B2 | 2/2018 | Janssen et al. | |
| 2004/0077505 A1 | 4/2004 | Daniel et al. | |
| 2004/0256287 A1* | 12/2004 | Miller | C10M 177/00 208/58 |
| 2008/0155889 A1 | 7/2008 | O'rear | |
| 2009/0159492 A1 | 6/2009 | Duhoux et al. | |
| 2019/0194558 A1* | 6/2019 | Eichelsdoerfer | C10G 45/00 |

OTHER PUBLICATIONS

International Search Report and Written Opinion received for PCT Patent Application No. PCT/EP2021/066351, mailed on Aug. 20, 2021, 09 pages.
Scherzer et al., "Hydrocracking Science and Technology", Engineering & Technology, Aug. 6, 1996, 84 Pages.
Blomberg et al., "Compehensive two-dimensional gas chromatography (GCxGC) and its applicability to the characterization of complex (petrochemical) mixtures", Journal of High Resolution Chromatography, vol. 20, Issue 10, Oct. 1997, pp. 539-544.

* cited by examiner

*Primary Examiner* — Ellen M McAvoy
*Assistant Examiner* — Chantel Graham
(74) *Attorney, Agent, or Firm* — Shell USA, Inc.

(57) ABSTRACT

The present invention provides a process to prepare middle distillates and base oils from a Fischer-Tropsch product, by (a) subjecting the Fischer-Tropsch product to a hydroprocessing step in the presence of a catalyst comprising a molecular sieve with a pore size between 5 and 7 angstrom and a $SiO_2/Al_2O_3$ ratio of at least 25, preferably from 50 to 180 and a group VIII metal to obtain a mixture comprising one or more middle distillate fractions and a first residual fraction and a naphtha fraction;
(b) separating the mixture as obtained in step (a) by means of atmospheric distillation into one or more middle distillate fractions, a first residual fraction and a naphtha fraction;
(c) separating the first residual fraction by means of vacuum distillation into at least a distillate base oil fraction and a second residual fraction.

11 Claims, No Drawings

PROCESS TO PREPARE FISCHER-TROPSCH DERIVED MIDDLE DISTILLATES AND BASE OILS

CROSS REFERENCE TO RELATED APPLICATIONS

This is a National stage application of International application No. PCT/EP2021/066351, filed 17 Jun. 2021, which claims priority of European Patent application No. 20180628.8, filed 17 Jun. 2020 which is incorporated herein by reference in its entirety.

FIELD OF THE INVENTION

The present invention relates to a process to prepare middle distillates and one or more base oils from a Fischer-Tropsch product and also relates to a gas oil and base oils obtained by said process.

BACKGROUND OF THE INVENTION

It is known in the art to prepare one or more middle distillate fractions such as for example kerosene or gas oil and a base oil precursor or a base oil from a Fischer-Tropsch derived feedstock with good cold flow properties. In WO2015/063213 for example, is disclosed a process wherein one or more middle distillate fractions and a first residual fraction are obtained by using two different catalysts in series in the hydroprocessing of a Fischer-Tropsch derived feedstock, wherein both catalysts have hydrocracking and hydroisomerising activity and the second catalyst is more active in hydroisomerisation and less active in hydrocracking compared to the first catalyst. Stacked bed in WO2015/063213 allows for the preparation of lubricating base oils and one or more middle distillate fractions with improved cold flow properties.

A problem of the process as disclosed in WO2015/063213 is that although this process allows for improved cold flow properties of the middle distillates it requires a high conversion per pass to obtain sufficiently low cold flow properties, resulting in yield loss on the valuable distillate base oil fraction.

In WO02/070627 for example, is disclosed a process wherein two or more lubricating base oil grades and a gas oil are obtained by subjecting the Fischer-Tropsch synthesis product to a hydroconversion catalyst and the obtained product needs to undergo further processing steps to obtain dewaxed base oils and a gas oil.

A problem of the process as disclosed in WO02/070627 is that although this process delivers a middle distillate and base oils, premium quality middle distillates are not being produced. In addition, isomerization of the distillate base oil fraction in the process disclosed in WO02/070627 is low and it needs to be further dewaxed so that the final base oil products meet their specific specifications.

SUMMARY OF THE INVENTION

It is an object of the invention to solve or minimize at least one of the above problems.

It is a further object of the invention to produce premium quality middle distillates.

Another object of the present invention is to produce a distillate base oil fraction which is sufficiently dewaxed to allow direct distillation into base oils and meeting their specifications.

Moreover, it is an object of the present invention to produce a vacuum bottoms product that from a viscosity and pour point perspective qualifies as, extra heavy base oil without the need for additional catalytic dewaxing.

One of the above or other objects may be achieved according to the present invention by providing a process to prepare middle distillates and base oils from a Fischer-Tropsch product, by (a) subjecting the Fischer-Tropsch product to a hydroprocessing step in the presence of a catalyst comprising a molecular sieve with a pore size between 5 and 7 angstrom and a $SiO_2/Al_2O_3$ ratio of at least 25, preferably from 50 to 180 and a group VIII metal to obtain a mixture comprising one or more middle distillate fractions and a first residual fraction and a naphtha fraction;

(b) separating the mixture as obtained in step (a) by means of atmospheric distillation into one or more middle distillate fractions, a first residual fraction and a naphtha fraction;

(c) separating the first residual fraction by means of vacuum distillation into at least a distillate base oil fraction and a second residual fraction.

It has now surprisingly been found according to the present invention that that by using a catalyst comprising a molecular sieve with a pore size between 5 and 7 angstrom and a $SiO_2/Al_2O_3$ ratio of at least 25, preferably from 50 to 180 and a group VIII metal in the hydroconversion step of a Fischer-Tropsch derived feedstock, a gas oil fraction with improved cold flow properties can be prepared in combination with an improved distillate base oil yield. With the catalyst according to the present invention distillate base oil fractions and second residual fraction with low pour point, and a high viscosity index can be obtained in a single hydrocracking step, without separate catalytic dewaxing step. In this way, a high viscosity base oil at sufficiently low pour point can be produced for application in e.g. process oils and finished lubricants without the need of additional dewaxing (less CAPEX, no additional yield loss).

An important advantage of the present invention is that premium quality middle distillates are obtained, meaning kerosene that qualifies for Jet-A1 from a freezing point perspective and gasoil that can be applied in Nordic or even Arctic grade diesel, either as blending component or as neat grade, mainly from a cloud point perspective.

A further advantage of the present invention is that a distillate base oil fraction can be produced which is sufficiently dewaxed to allow direct distillation into one or more base oils that meet their specific specifications. The present invention therefore allows for a line-up where the catalytic dewaxing unit (CDW) can be omitted.

Another advantage is that the present invention produces a vacuum bottoms product (=second residual fraction) that from a pour point and viscosity perspective qualifies as, extra heavy base oil (XHBO) without the need for additional catalytic dewaxing (X-CDW).

An advantage of the catalyst used according to the present invention is that the catalyst preferably converts the heavier molecules. This results in high yield of highly isomerized distillate base oil fraction and consequently in a high yield of distillate base oils. It also provides a high degree of isomerization in the residual base oil fraction. The high degree of isomerization of the middle distillate fractions allows operation at reduced conversion per pass which increases distillate base oil fraction yield even further.

DETAILED DESCRIPTION OF THE INVENTION

In step (a) of the process according to the present invention a Fischer-Tropsch product is subjected to a hydroprocessing step in the presence of a catalyst comprising a molecular sieve with a pore size between 5 and 7 angstrom and a SiO2/Al2O3 ratio of at least 25, preferably from 50 to 180 and a group VIII metal to obtain a mixture comprising one or more middle distillate fractions, a first residual fraction and a naphtha fraction.

Fischer-Tropsch product stream is known in the art. By the term "Fischer-Tropsch product" is meant a synthesis product of a Fischer-Tropsch process. In a Fischer-Tropsch process synthesis gas is converted to a synthesis product. Synthesis gas or syngas is a mixture of hydrogen and carbon monoxide that is obtained by conversion of a hydrocarbonaceous feedstock. Suitable feedstock include natural gas, crude oil, heavy oil fractions, coal, biomass and lignite. A Fischer-Tropsch product derived from a hydrocarbonaceous feedstock which is normally in the gas phase may also be referred to a GTL (Gas-to-Liquids) product. The preparation of a Fischer-Tropsch product has been described in e.g. WO2003/070857.

The product stream of the Fischer-Tropsch process is usually separated into a water stream, a gaseous stream comprising unconverted synthesis gas, carbon dioxide, inert gasses and C1 to C3, and a C4+ stream.

The full Fischer-Tropsch hydrocarbonaceous product suitably comprises a C1 to C300 fraction.

Lighter fractions of the Fischer-Tropsch product, which suitably comprises C3 to C9 fraction are separated from the Fischer-Tropsch product by distillation thereby obtaining a Fischer-Tropsch product stream, which suitably comprises C10 to C300 fraction.

The weight ratio of compounds having at least 60 or more carbon atoms and compounds having at least 30 carbon atoms in the Fischer-Tropsch product is preferably at least 0.2, more preferably 0.3.

The Fischer-Tropsch product used in the present invention is a paraffinic feedstock that comprises at least 50 wt % of compounds boiling above 370° C. and which has a paraffin content of at least 60 wt %, an aromatics content of below 1 wt %, a naphthenic content of below 2 wt %, a nitrogen content of below 0.1 wt %, and a sulphur content of below 0.1 wt %.

Hydroprocessing in step (a) may take place in a heavy paraffin conversion unit. In this unit, in the presence of the catalyst of step (a) both hydrocracking and hydroisomerization takes place. In step (a), the product stream is contacted in the presence of hydrogen, at a pressure in the range of 20 to 100 barg and at a temperature between 250 and 400° C. Preferably, step (a) takes place at a pressure in the range of from 30 to 70 barq and at a temperature between 300 and 400° C. Hydrocracking/hydroisomerization processes are known in the art and therefore not discussed here in detail. Hydrocracking/hydroisomerization and the effect of hydrocracking/hydroisomerization conditions on the amount of isomerised product are for example described in Chapter 6 of "Hydrocracking Science and Technology", Julius Scherzer; A. J. Cruia, Marcel Dekker, Inc, New York, 1996, ISBN 0-8247-9760-4.

Step (a) takes place in the presence of a catalyst comprising a molecular sieve with a pore size between 5 and 7 angstrom and a SiO2/Al2O3 ratio of at least 25, preferably from 50 to 180 and a group VIII metal.

Suitably, the catalyst used in step (a) of the process according to the present invention comprises a molecular sieve with a pore size between 5 and 6.6 angstrom.

Preferably, the dewaxing catalysts are heterogeneous catalysts comprising molecular sieves, more suitably 10- or 12-membered ring molecular sieves with pore sizes between 5 and 6.6 angstrom, preferably monodimensional 10- or 12-membered ring molecular sieves with pore sizes between 5 and 6.6 angstrom, more preferably monodimensional 10- or 12-membered ring molecular sieves with pore sizes between 5 and 6.2 angstrom in combination with a metal having a hydrogenation function, such as the Group VIII metals. The indicated pore sizes relate to the largest diameter of the pores as described in the 6th revised edition of the Atlas of Zeolite Framework Types published in 2007 on behalf of the Structure Commission of the International Zeolite Association.

Preferably, hydrocracking in step (a) is performed in the presence of a catalyst comprising a molecular sieve and a group VIII metal, wherein the molecular sieve is selected from a group consisting of a MTW, MTT, TON type molecular sieve, ZSM-48 and EU-2.

In the present invention, the reference to ZSM-48 and EU-2 is used to indicate that all zeolites can be used that belong to the ZSM-48 family of disordered structures also referred to as the *MRE family and described in the Catalogue of Disorder in Zeolite Frameworks published in 2000 on behalf of the Structure Commission of the International Zeolite Association. Even if EU-2 would be considered to be different from ZSM-48, both ZSM-48 and EU-2 can be used in the present invention. Zeolites ZBM-30 and EU-11 resemble ZSM-48 closely and also are considered to be members of the zeolites whose structure belongs to the ZSM-48 family. In the present application, any reference to ZSM-48 zeolite also is a reference to ZBM-30 and EU-11 zeolite.

Besides ZSM-48 and/or EU-2 zeolite, further zeolites can be present in the catalyst composition especially if it is desired to modify its catalytic properties. It has been found that it can be advantageous to have present zeolite ZSM-12 which zeolite has been defined in the Database of Zeolite Structures published in 2007/2008 on behalf of the Structure Commission of the International Zeolite Association.

Suitable Group VIII metals are nickel, cobalt, platinum and palladium. Preferably, a Group VIII metal is platinum or palladium.

Preferably, the catalyst used in step (a) comprises a molecular sieve, platinum or palladium as Group VIII metal and a silica or titania binder, wherein the molecular sieve is a MTW, MTT, TON type molecular sieve or ZSM-48 or EU-2.

Suitably, the catalyst used in step (a) is a catalytic dewaxing catalyst.

The dewaxing catalyst suitably also comprises a binder. The binder can be non-acidic. Examples of suitable binders are clay, silica, titania, zirconia, alumina, mixtures and combinations of the above and other binders known to one skilled in the art.

Preferably the catalyst comprises a silica or a titania binder.

Preparation of the dewaxing catalysts for in step (a) is for example described in WO2015/063213.

The obtained mixture in step (a) preferably is a at least partially isomerised feedstock. The catalyst used in step (a) according the present invention leads to a higher isomerization degree of the obtained mixture in step (a) than the isomerization degree as obtained when using catalysts system as described in WO2015/063213 and WO02/070627 when operated at comparable conversion per pass. This higher isomerization degree results in lower cloud point of the obtained middle distillates and lower pour point of base oils and residual base oils.

In step (b) of the process according to the present invention the mixture as obtained in step (a) is separated by means of atmospheric distillation into one or more middle distillate fractions, a first residual fraction and a naphtha fraction.

Preferably, the cloud point according to ASTM D2500 of the one or more middle distillate fractions as obtained in step (b) is between −10 and −50° C., more preferably between −15 and −35° C.

The one or more middle distillate fractions may comprise a single middle distillate fraction, for example a single fraction having a majority of components, for instance 95 vol % or greater, boiling in the range of from 150° C. to 400° C. This single fraction is preferably a wide range gas oil. Preferably, in step (b) at least a gas oil fraction is obtained. The gas oil fraction will usually contain a majority of components having boiling points within the typical diesel fuel ("gas oil") range, i.e. from about 150 to 400° C. or from 170 to 370° C. It will suitably have a 90 vol % distillation temperature of from 300 to 370° C. according to ASTM D86. Said gas oil fraction is typically a wide range heavy gas oil fraction. The cloud point of the gas oil fraction (wide range or heavy gas oil) is preferably below −10° C., preferably between −15 and −35° C. and is therefore suitable for the production of Nordic/and or arctic grade diesel and/or diesel blending components.

Optionally, the wide range gas oil can be distilled into a kerosene fraction and a heavy gas oil fraction.

The kerosene fraction as obtained in step b) has a freezing point below −40° C. In this way, the kerosene fraction as obtained in step b) according to the process of the present invention has cold flow properties which properties make the kerosene fraction suitable as a jet-A or even jet-A1 blending component.

The first residual fraction comprises compounds boiling above the middle distillate boiling range. Suitably, the first residual fraction is a fraction of which at least 95 wt. % has a boiling point above 330° C.

The obtained first residual fraction has a higher isomerization degree then when obtained according to the processes as described in WO2015/063213 and WO02/070627 when operated at comparable conversion per pass. This higher isomerization degree is because of the use of the catalyst according to the present invention. In this way a first residual fraction with a lower pour point is obtained.

In step (c) of the process of the present invention the first residual fraction is separated by means of vacuum distillation into at least a distillate base oil fraction and a second residual fraction. The second residual fraction thus obtained typically comprises compounds boiling above a temperature of 440° C.

Preferably, the boiling point at which 10 wt. % of the second residual fraction from step (c) is recovered is in the range between 440 and 560° C. according to ASTM D7169, more preferably the boiling point at which 5 wt. % is recovered is in the range between 440 and 560° C. according to ASTM D7169.

The second residual fraction as obtained according to the present invention thus qualifies as an extra heavy base oil without the need for additional catalytic dewaxing step unlike the processes as described for example in WO2015/063213 and WO02/070627. The second residual fraction is also known as a vacuum bottoms product. The second residual fraction may undergo a subsequent dewaxing step to obtain extra heavy base oil with a better pour point. With the term extra heavy base oil is meant a residual base oil.

In one embodiment the second residual fraction is a residual base oil.

In another embodiment the second residual fraction is further dewaxed to obtain a residual base oil.

Suitably, the residual base oil has a pour point below −5°, preferably in a range between −10° C. and −40° C. Also, the residual base oil has a kinematic viscosity at 100° C. in a range between 10 and 35 cSt, preferably between 12 and 30 cSt.

Optionally, the process according to the present invention comprises a further step (d) wherein at least part of the second residual fraction is recycled to step (a).

In case of recycling of the second residual fraction or another fraction obtained in fractionation of the hydroprocessed feedstock, reference herein to the feedstock to step (a) is to the combined feedstock i.e. to the total of fresh feedstock and any recycled fraction.

The distillate base oil fraction as obtained in step (c) will have an intermediate boiling range. Preferably, the boiling point at which 90 wt. % of the distillate base oil fraction from step (c) is recovered is in the range of from 420 and 560° C. according to ASTM D2887.

Preferably, the process according to the present invention comprises a further step (e) wherein the distillate base oil fraction is fractionated in one or more base oils.

In one embodiment, the distillate base oil fraction may not be sufficiently isomerized. This base oil fraction may be further dewaxed and fractionated in one or more base oils and optionally an isomerized gas oil fraction, preferably in a base oil having a kinematic viscosity according to ASTM D445 at 100° C. in a range of from 1.2 to 3 Cst and/or a base oil having a kinematic viscosity at 100° C. in a range of from 3 to 5 Cst and/or in a base oil having a kinematic viscosity at 100° C. in a range of from 5 to 7 and/or in a base oil having a kinematic viscosity according to ASTM D445 at 100° C. in a range of from 7 to 9 Cst.

In another embodiment, the distillate base oil fraction is sufficiently isomerized and may be separated in one or more base oils and optionally an isomerized gas oil fraction. The second distillate base oil fraction is preferably fractionated in one or more base oils. In yet in another embodiment the distillate base oil fraction is sufficiently isomerized and separated in two or more base oils. This distillate base oil fraction is separated in various base oils with a kinematic viscosity at 100° C. in a range of from 1.2 to 9 Cst.

The distillate base oil fraction as obtained in step c) according to the process of the present invention has such a low pour point after step c) that the process according to the present invention enables production of base oils without additional dewaxing (less CAPEX, no additional yield loss) unlike the processes as described in WO2015/063213 and in WO02/070627. In addition, the distillate base oil fraction and derived base oils from step e) have a high viscosity index, higher than the distillate base oil fraction and derived base oils as obtained in a process as described in WO2015/063213, which makes the distillate base oil fraction highly suitable for applications in process oils and finished lubricants.

In another aspect, the present invention provides a Fischer-Tropsch derived Arctic or severe winter climates grade gas oil according to paraffinic diesel fuel specification EN15940 with a cloud point below −10° C., preferably between −10° C. and −60° C. according to ASTM D2500. With Artic or severe winter climates range gas oil is meant the wide range or heavy gas oil as obtained in step b) according to the process of the present invention.

In a further aspect the present invention provides a Fischer-Tropsch derived distillate base oil according to the present invention with a pour point lower than −10° C., preferably between −20 and −50° C.

Preferably, the Fischer-Tropsch derived distillate base oil has a Viscosity Index between 100 and 150.

In another aspect the present invention provides a Fischer-Tropsch derived residual base oil according to the present invention having a Vk100 above 10 mm2/s, pour point below −5° C. With the term extra heavy base oil is meant a Fischer-Tropsch derived residual base oil.

The following examples of certain aspects of some embodiments are given to facilitate a better understanding of the present invention. In no way should these examples be read to limit, or define, the scope of the invention.

Experimental A

A Fischer-Tropsch feed was obtained by fractionating the C5+ effluent from a Fischer-Tropsch process to obtain a heavy C14+ stream to be used in the experiments and a light <C14 stream that was not used. The heavy C14+ stream contained 80% w boiling above 370° C. and 47% w above 540° C. as determined by ASTM D-7169. The Fischer-Tropsch feed was continuously fed to a hydrocracking step in once-through mode of operation at 38 barg. The liquid product from the hydrocracking step was separated in a fractionator with a cut point between 320 and 370° C. into a distillate fraction and a first residual fraction. Boiling point distribution of distillate and first residual fraction was determined according to ASTM D-2887 and ASTM D-7169, respectively, while N-paraffin content was determined based on a GC×GC technique as described in Blomberg et al. J. High Resol. Chromatogr. 20 (1997) p 539. Cloud point and Pour point of the light and heavy product was determined according to ASTM D5773 and ASTM D5949.

Example 1

In the hydrocracking step the feed was contacted with a silica-bound, ammonium hexafluorosilicate-treated Pt/ZSM-12 catalyst at temperatures between 320-335° C. Other conditions were chosen such that 370° C.+ conversion was in the range of 35-75% w. Yields and n-paraffin content at 50% 370° C.+ conversion were calculated by interpolation and are presented in Table 1. Cold flow properties of the products at 58% 370° C.+ conversion are presented in Table 2.

Example 2 (Comparative Example)

In the hydrocracking step the feed was contacted with a catalyst which comprised a 0.8 wt % platinum on an amorphous silica-alumina carrier containing 4 wt. % of zeolite beta and 66 wt. % of silica-alimina (alumina content of 29 wt. %) and 30 wt. % of alumina binder at temperatures between 300-310° C. Other conditions were chosen such that 370° C.+ conversion was in the range of 35-75% w. Yields and n-paraffin content at 50% 370° C.+ conversion were calculated by interpolation and are presented in Table 1. Cold flow properties of the products at 62% 370° C.+ conversion are presented in Table 2.

Example 3

The first residual fraction from example 1 obtained at 58% 370° C.+ conversion was vacuum distilled in three fractions. The kinematic viscosity at 100° C. as measured according to ASTM D7042, the cloud point according to ASTM D2500 and the pour point according to ASTM D97 of the fractions are presented in Table 3.

TABLE 1

Yield distribution and n-paraffin content at 50% 370° C. + conversion

|  |  | Example 1 | Example 2 |
|---|---|---|---|
| C1-C4 | % w | 3.5 | 2.4 |
| C5-150° C. | % w | 10.6 | 11.2 |
| 150-370° C. | % w | 45.3 | 46.0 |
| 370-540° C. | % w | 28.7 | 27.0 |
| >540° C. | % w | 11.8 | 13.4 |
| n-paraffin in C10-C22 | % w | 8.2 | 23.6 |
| n-paraffin in C23-C40 | % w | 0.4 | 13.2 |

TABLE 2

Cold flow properties at 60% 370° C. + conversion

|  |  | Example 1 | Example 2 |
|---|---|---|---|
| Cloud point distillate fraction comprising middle distillate fraction and naphtha | ° C. | −50 | −14 |
| Pour point distillate fraction comprising middle distillate fraction and naphtha | ° C. | −61 | −21 |
| Pour point first residual fraction product | ° C. | −39 | >+45 |

TABLE 3

Product properties of fractions obtained according to the invention

|  |  | Fraction 1 | Fraction 2 | Fraction 3 |
|---|---|---|---|---|
| Vk 100° C. | cSt | 2.2 | 3.6 | 12.9 |
| Viscosity Index |  | 114 | 130 | 148 |
| Pour Point | ° C. | −42 | −30 | −39 |

Discussion

The data as presented show that with the catalyst according to the invention similar yields are obtained as with the catalyst in the comparative example (see table 1). However, the n-paraffin content in both the middle distillate range (C10-C22) as well as for the heavier fraction is much lower for the catalyst according to the invention, indicating higher isomerization degree (see table 1). This is also visible in lower cloud point and pour point of the light product fraction (see table 2, the fraction comprising the middle distillate fraction and naphtha) as well as in the lower pour point of the heavy product fraction (see table 2, the first residual fraction). With the catalyst according to the invention base oil fractions with good cold flow properties and viscosity index can be obtained in a single hydrocracking process step, without separate catalytic dewaxing step (see table 3).

Experimental B

Experiments were done using a Fischer Tropsch derived waxy feed. This feed is a C5+ effluent from a Fischer Tropsch process. About 76% w of the feed boils above 370° C. and about 53% w boils above 540° C. as determined using ASTM D7169.

The feed was continuously fed to a hydrocracking step using a catalyst system at a WHSV based on fresh feed of 0.8 t/m3/h and at a unit pressure of 60 barg. The hydrogen gas-to-oil ratio was about 1250 Nm3/t fresh feed. The catalyst bed temperature was varied to set the desired conversion and ranged from 325-345° C. The product passed through a high-pressure separator and the recovered liquid product was subsequently separated in an atmospheric fractionator which operates at an effective cut point of about 370° C. A distillate fraction was recovered from the top of the fractionator while the first residual fraction was sent to a vacuum flasher which operates at an effective cut point of about 540° C.

A distillate base oil fraction was recovered from the top of the flasher, while the second residual fraction was either recovered (once-through operation) or recycled back to the inlet of the hydrocracker (recycle operation). The produced gasses were recovered from both the high-pressure separator and the atmospheric column and analyzed by on-line gas chromatography.

Boiling point distribution of produced fractions was determined using ASTM D2887 or ASTM D7169. The n-paraffin content was determined by a GC×GC technique as described in Blomberg et al. J. High Resol. Chromatogr. 20 (1997) p 539. Pour and Cloud point of the fractions was determined using ASTM D97 and ASTM D2500. Freezing point was determined using ASTM D2386. Viscosity measurements used ASTM-D7042. Viscosity Index was calculated according to ASTM D2270.

Part of the produced distillate fractions were distilled off-line into naphtha and middle distillate product fractions using ASTM D2892. Part of the distillate base oil fractions were vacuum distilled off-line into different base oil fractions using spinning band distillation.

Example 4

In the hydrocracking step the feed was contacted, in once-through mode of operation, with a silica-bound, ammonium hexafluorosilicate-treated Pt/ZSM-12 catalyst. Yields and product properties at 50% 370° C.+ conversion were calculated by interpolation and are presented in Table 4. Using the same approach, performance data was derived at similar pour point of the distillate base oil fraction, presented in Table 5, and at similar cloud point of the recovered distillate fraction, presented in Table 6.

Example 5 (Comparative Example)

The experiment of example 4 was repeated using a stacked bed catalyst system. The system comprised a first catalyst above a second catalyst in an 80/20 ratio (v/v). The first catalyst comprised a 0.8 wt % platinum on an amorphous silica-alumina carrier containing 70 wt. % of silica-alimina (alumina content of 29 wt. %) and 30 wt. % of alumina binder. The second catalyst is the silica-bound, ammonium hexafluorosilicate-treated Pt/ZSM-12 catalyst as applied in example 4. Results are presented in Tables 4-6.

Experiment 6 (Comparative Example)

The experiment of example 4 was repeated using a catalyst which comprised a 0.8 wt % platinum on an amorphous silica-alumina carrier containing 70 wt. % of silica-alimina (alumina content of 29 wt. %) and 30 wt. % of alumina binder Results are presented in Tables 4-6.

TABLE 4

| Comparison at similar conversion (50%) | | | | |
|---|---|---|---|---|
| | | Example 4 | Example 5 | Example 6 |
| Net 370° C. + conversion | % wof | 50 | 50 | 50 |
| WABT | ° C. | 340 | 334 | 335 |
| Product Yields | | | | |
| C1-C4 | % wof | 2.8 | 2.4 | 2.2 |
| C5-175° C. | % wof | 20.0 | 19.6 | 19.9 |
| 175-370° C. | % wof | 40.4 | 39.6 | 39.2 |
| 370-540° C. | % wof | 24.6 | 21.1 | 22.5 |
| >540° C. | % wof | 12.9 | 17.7 | 16.4 |
| Product properties of the fraction comprising middle distillate fraction and naphtha | | | | |
| n-paraffins C10-C22 | % w | 11.5 | 17.5 | 21.4 |
| Cloud Point | ° C. | −42 | −27 | −21 |
| Product properties of the distilled base oil fractions | | | | |
| n-paraffins C23-C40 | % w | <0.1 | 0.9 | 5.6 |
| Pour Point | ° C. | −41 | −2 | 46 |
| Product properties of the second residual fraction | | | | |
| Pour Point | ° C. | −17 | 89 | 107 |
| Vk100 | cSt | 25.2 | n.d | n.d. | n.d. = not determined

Discussion

The data as presented in table 4 shows that at similar conversion a higher yield of the distillate base oil fraction is obtained compared to the catalysts systems as used in comparative examples 5 and 6, which translates into higher base oil yields.

The better cloud point of the distillate fraction as obtained in example 4 according to the present invention enables manufacturing of high value middle distillate products to be used in for example arctic grade diesel.

The very low pour point of the distillate base oil fraction (−41°) which has been produced according to the present invention (example 4) enables the production of base oils without additional dewaxing (less CAPEX, no additional yield loss).

The second residual fraction obtained in example 4 has a viscosity of about 25 cSt, and a pour point of −17° C., indicating that high viscosity at sufficiently low pour point can be produced according to the present invention without the need of an additional catalytic dewaxing step. These base oils are suitable for application in process oils and finished lubricants.

TABLE 5

Comparison at similar pour point (−36° C.) of the 370-540° C. fraction (distillate base oil fraction)

| Catalyst system | | Example 4 | Example 5 | Example 6 |
|---|---|---|---|---|
| Net 370° C. + conversion | % wof | 46 | 69 | Not feasible |
| WABT | ° C. | 338 | 338 | |
| Product Yields | | | | |
| C1-C4 | % wof | 2.6 | 4.0 | |
| C5-175° C. | % wof | 18.9 | 26.3 | |
| 175-370° C. | % wof | 38.7 | 46.2 | |
| 370-540° C. | % wof | 25.4 | 14.8 | |
| >540° C. | % wof | 15.1 | 9.2 | |
| Product properties of the fraction comprising middle distillate fraction and naphtha | | | | |
| n-paraffins C10-C22 | % w | 13.9 | 9.8 | |
| Cloud Point | ° C. | −38 | −55 | |
| Product properties of the distilled base oil fraction | | | | |
| n-paraffins C23-C40 | % w | 0.1 | 0.1 | |
| Pour Point | ° C. | −36 | −36 | Cannot be achieved |
| Viscosity Index | | 153 | 136 | |
| Product properties of the second residual fraction | | | | |
| Pour Point | ° C. | −10 | 68 | |
| Vk100 | cSt | 25.8 | — | |

<sup>a</sup>Cannot be achieved with the catalyst system of Example 6

Discussion

The data as presented in table 5 shows that at similar pour point of the distillate base oil fraction a much higher distillate base oil yield is obtained compared to the catalysts systems as used in comparative example 5, which translates into higher base oil yields.

The very low pour point of the distillate base oil fraction (−36°) which has been produced according to the present invention (example 4) enables the production of base oils without additional dewaxing (less CAPEX, no additional yield loss).

The higher viscosity index of the distillate base oil fraction compared to the viscosity index as obtained in example 5 brings additional value to the base oils as obtained according to the present invention (example 4). The second residual fraction obtained in example 4 has a viscosity of about 25 cSt, and a pour point of −10° C., indicating that high viscosity base oil at sufficiently low pour point can be produced according to the present invention without the need of an additional catalytic dewaxing step. These base oils are suitable for application in process oils and finished lubricants. Although the target of these examples was to prepare base oils, example 4 also led to the production of a distillate fraction with a very low cloud point.

TABLE 6

Comparison at similar cloud point (−30° C.) of the <370 fraction (distillate fraction)

| | | Example 4 | Example 5 | Example 6<sup>a</sup> |
|---|---|---|---|---|
| Net 370° C. + conversion | % wof | 38 | 52 | Not feasible |
| WABT | ° C. | 335 | 335 | |
| Product Yields | | | | |
| C1-C4 | % wof | 2.2 | 2.5 | |
| C5-175° C. | % wof | 16.4 | 20.3 | |
| 175-370° C. | % wof | 35.1 | 40.3 | |
| 370-540° C. | % wof | 27.0 | 20.4 | |
| >540° C. | % wof | 19.9 | 16.8 | |
| Product properties of the fraction comprising middle distillate fraction and naphtha | | | | |
| n-paraffins C10-C22 | % w | 19.4 | 16.7 | |
| Cloud Point | ° C. | −30 | −30 | Cannot be achieved |
| Product properties of the distilled base oil fractions | | | | |
| n-paraffins C23-C40 | % w | 0.3 | 0.8 | |
| Pour Point | ° C. | −23 | −5 | |

TABLE 6-continued

Comparison at similar cloud point (−30° C.)
of the <370 fraction (distillate fraction)

|  |  | Example 4 | Example 5 | Example 6[a] |
|---|---|---|---|---|
| Product properties of the second residual fraction | | | | |
| Pour Point | ° C. |  | 6 | 86 |
| Vk100 | cSt |  | 27.1 | — |

[a]Cannot be achieved with the catalyst system of Example 6.

Discussion

The data as presented in table 6 shows that at similar cloud point of the distillate fraction a much higher yield of the distillate base oil fraction is obtained compared to the catalysts systems as used in comparative examples 5 as it allows to operate at lower conversion per pass, which translates into higher base oil yields The very low cloud point of −30° C. of the distillate fraction as obtained in example 4 according to the present invention enables production of Nordic and/or artic grade diesel and/or diesel blending components which brings additional value.

The very low pour point of the distillate base oil fraction which has been produced according to the present invention (example 4) enables the production of base oils without additional dewaxing (less CAPEX, no additional yield loss).

We claim:

1. Process to prepare middle distillates and base oils from a Fischer-Tropsch product, by
   (a) subjecting the Fischer-Tropsch product to a hydroprocessing step in the presence of a catalyst comprising a molecular sieve with a pore size between 5 and 7 angstrom and a $SiO_2/Al_2O_3$ ratio of at least 25 and a group VIII metal to obtain a mixture comprising one or more middle distillate fractions and a first residual fraction and a naphtha fraction;
   wherein the Fischer-Tropsch product is a paraffinic feedstock that comprises at least 50 wt. % of compounds boiling above 370° C. and which has a paraffin content of at least 60 wt. %, an aromatics content of below 1 wt. %, a naphthenic content of below 2 wt. %, a nitrogen content of below 0.1 wt. %, and a sulphur content of below 0.1 wt. %;
   (b) separating the mixture as obtained in step (a) by means of atmospheric distillation into one or more middle distillate fractions, a first residual fraction and a naphtha fraction;
   (c) separating the first residual fraction by means of vacuum distillation into at least a distillate base oil fraction and a second residual fraction,
   wherein the distillate base oil obtained in step (c) enables production of base oils without additional dewaxing.

2. Process according to claim 1, wherein the catalyst used in step (a) comprises a molecular sieve, platinum or palladium as Group VIII metal and a silica or titania binder and wherein the molecular sieve is a MTW, MTT, TON type molecular sieve or ZSM-48 or EU-2.

3. Process according to claim 1, wherein the catalyst used in step (a) is a catalytic dewaxing catalyst.

4. Process according to claim 1, wherein the one or more distillate fractions as obtained in step (b) is at least a gas oil fraction.

5. Process according to claim 1, wherein the boiling point at which 10 wt. % of the second residual fraction from step (c) is recovered is in the range between 44° and 560° C. according to ASTM D7169, more preferably the boiling point at which 5 wt. % is recovered is in the range between 440 and 560° C. according to ASTM D7169.

6. Process according to claim 1, further comprising:
   (d) recycling at least part of the second residual fraction to step (a).

7. Process according to claim 1, further comprising:
   (e) fractionating the distillate base oil fraction into one or more base oils.

8. Fischer-Tropsch derived Artic or severe winter climates range gas oil obtainable according to claim 1 with a cloud point between −10 and −60° C. according to ASTM 2500.

9. Fischer-Tropsch derived distillate base oil obtainable according to claim 1 with a pour point lower than −10° C.

10. Fischer-Tropsch derived distillate base oil according to claim 9 having a Viscosity Index between 100 and 150.

11. Fischer-Tropsch derived residual base oil obtainable according to claim 1 with a vk100 above 10 mm2/s and a pour point below −10 degrees Celsius.

* * * * *

UNITED STATES PATENT AND TRADEMARK OFFICE
CERTIFICATE OF CORRECTION

PATENT NO. : 12,195,681 B2
APPLICATION NO. : 18/000955
DATED : January 14, 2025
INVENTOR(S) : Edward Julius Creyghton et al.

It is certified that error appears in the above-identified patent and that said Letters Patent is hereby corrected as shown below:

In the Claims

In Column 14, Line 30, in Claim 5, delete "44°" and insert -- 440 --.

In Column 14, Lines 31-33, in Claim 5, delete "D7169, more preferably the boiling point at which 5 wt. % is recovered is in the range between 440 and 560° C. according to ASTM D7169." and insert -- D7169. --.

Signed and Sealed this
Twenty-second Day of April, 2025

Coke Morgan Stewart
*Acting Director of the United States Patent and Trademark Office*